(12) United States Patent
Houser et al.

(10) Patent No.: US 8,444,165 B2
(45) Date of Patent: May 21, 2013

(54) GUARD BAR AND TUNABLE FOOTPEG SYSTEM FOR ALL-TERRAIN VEHICLES

(76) Inventors: Jessica Renee Houser, Marion, OH (US); John Abbott Houser, Marion, OH (US); Jeffrey David Houser, Green Camp, OH (US)

( * ) Notice: Subject to any disclaimer, the term of this patent is extended or adjusted under 35 U.S.C. 154(b) by 0 days.

(21) Appl. No.: 13/047,427

(22) Filed: Mar. 14, 2011

(65) Prior Publication Data

US 2012/0286494 A1 Nov. 15, 2012

Related U.S. Application Data

(60) Provisional application No. 61/340,107, filed on Mar. 12, 2010.

(51) Int. Cl.
*B62J 25/00* (2006.01)

(52) U.S. Cl.
CPC ........................................ *B62J 25/00* (2013.01)
USPC .............................. 280/291; 280/163; 74/564

(58) Field of Classification Search
USPC ... 74/564, 594.7; 180/90.6; 296/75; 280/291, 280/163
See application file for complete search history.

(56) References Cited

U.S. PATENT DOCUMENTS

| | | | | | |
|---|---|---|---|---|---|
| 374,287 | A | * | 12/1887 | Benfield | 280/291 |
| 1,480,421 | A | * | 1/1924 | Smith | 74/564 |
| 4,591,179 | A | * | 5/1986 | Nakamura | 280/291 |
| 4,852,900 | A | * | 8/1989 | Nahachewski | 280/291 |
| 5,456,138 | A | * | 10/1995 | Nutile et al. | 74/594.6 |
| 6,116,630 | A | * | 9/2000 | Thomas | 280/291 |
| 6,339,972 | B1 | * | 1/2002 | Paris | 74/564 |
| 6,663,129 | B1 | * | 12/2003 | Smith | 280/291 |
| 2008/0029990 | A1 | * | 2/2008 | Danze | 280/163 |
| 2008/0179859 | A1 | * | 7/2008 | Boehmke et al. | 280/291 |

* cited by examiner

*Primary Examiner* — Paul N Dickson
*Assistant Examiner* — Maurice Williams
(74) *Attorney, Agent, or Firm* — Jerry K. Mueller, Jr.; Mueller Law, LLC

(57) ABSTRACT

A guard bar apparatus is configured to protect the legs of ATV riders, and provide a secure mounting location for shock absorbing tunable footpegs. The guard bar assembly provides for a pivot point for allowing rapid turns around fixed objects. The footpeg apparatus is configured with a cradle having a receiving cavity within which one or more elastomeric balls may be positioned to function as shock absorbers. A foot contact component is pivotally mounted to provide a foot engagable surface and an oppositely disposed biasing surface which pivotally moves against the balls within the receiving cavity to achieve a shock absorbing function. A travel limiting feature limits the travel of the foot contact component and may be utilized to preload the receiver cavity containing balls into compression.

18 Claims, 13 Drawing Sheets

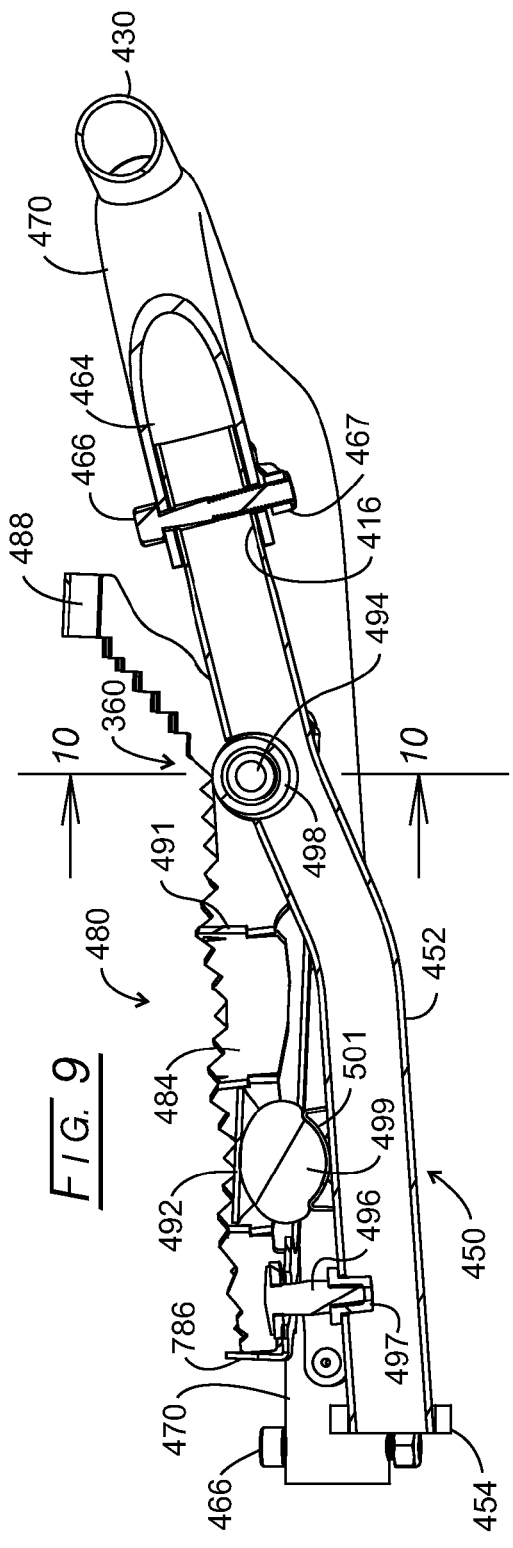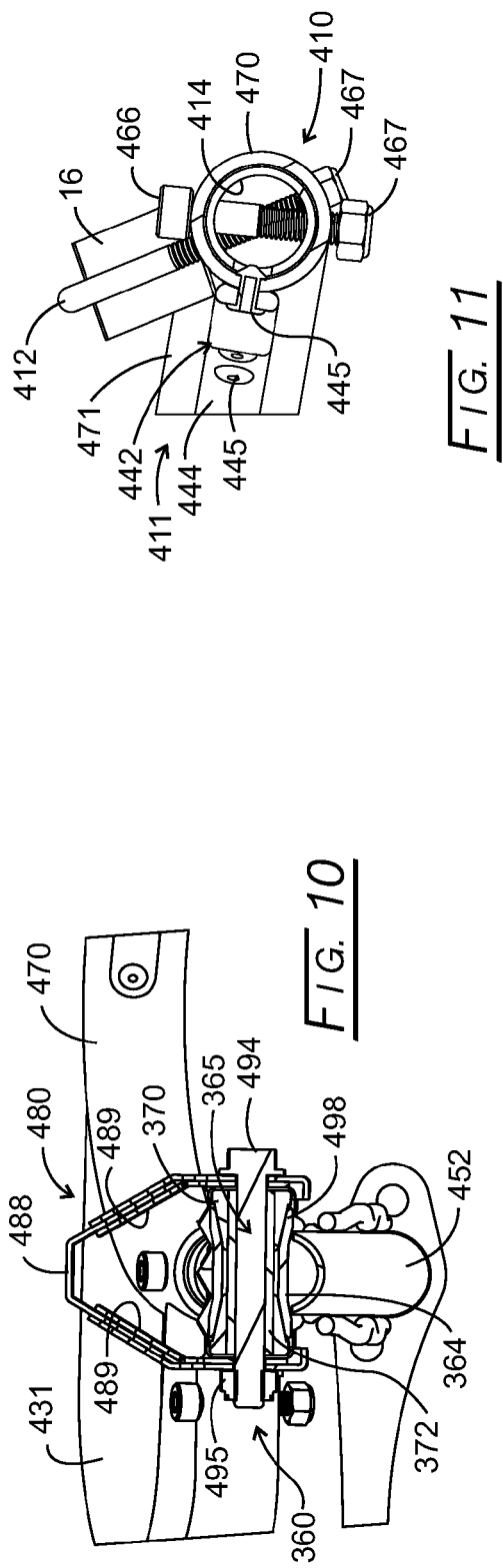

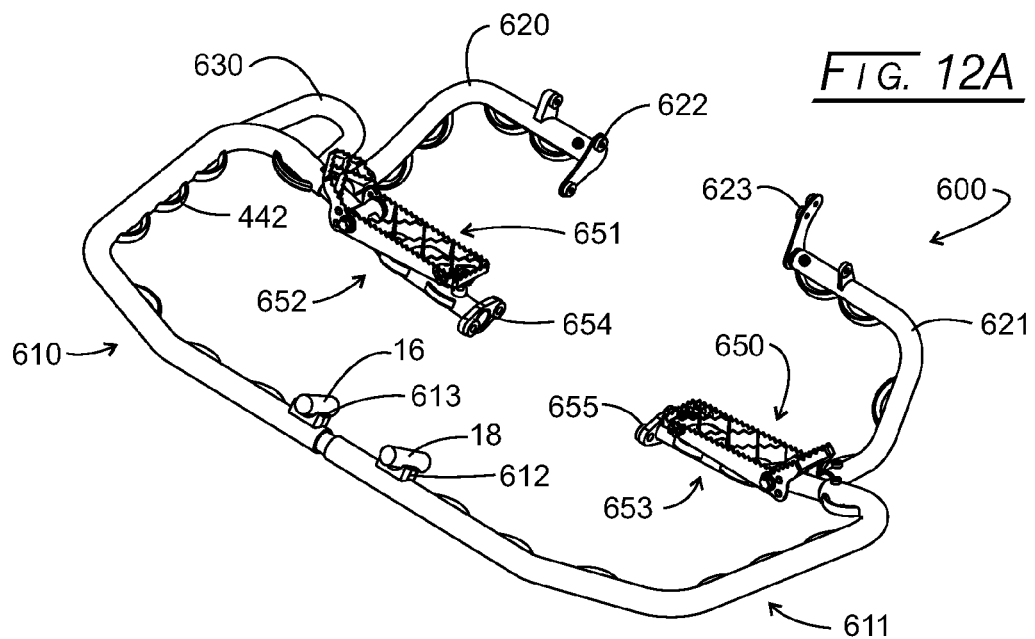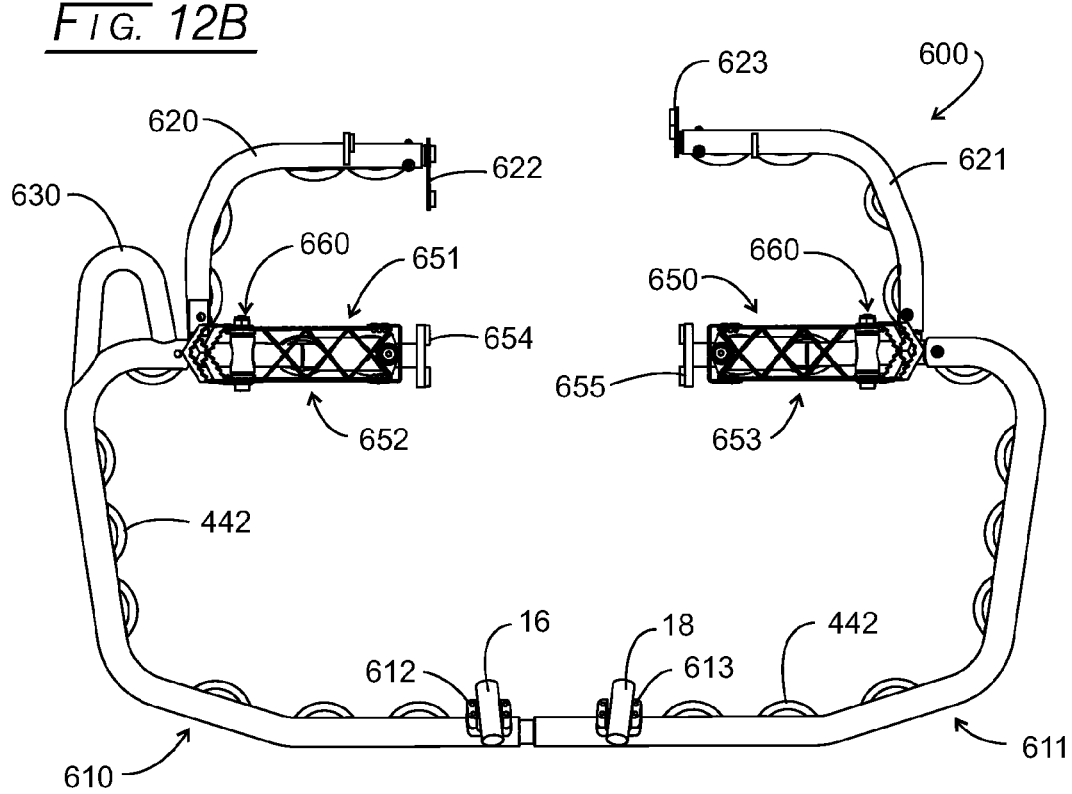

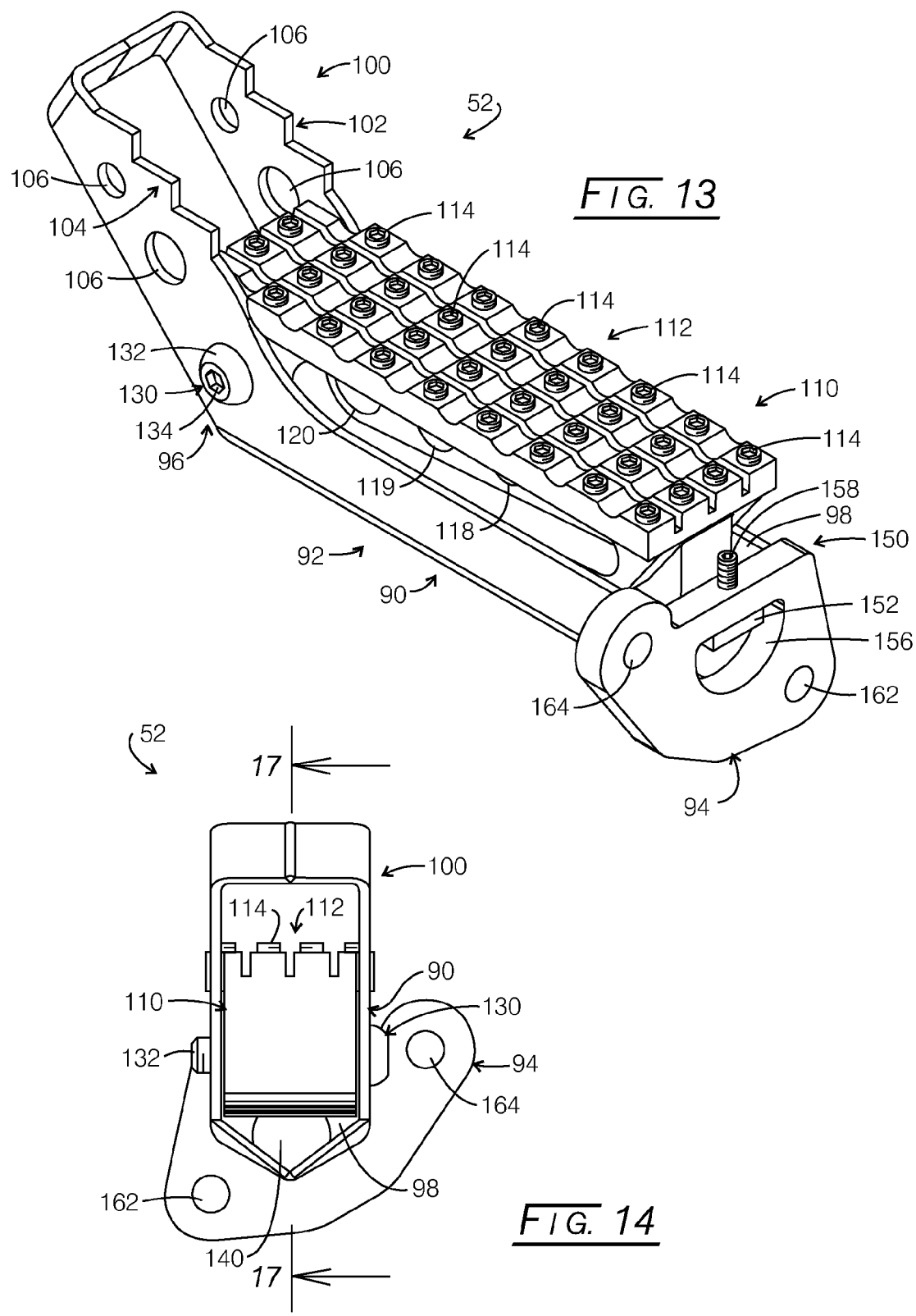

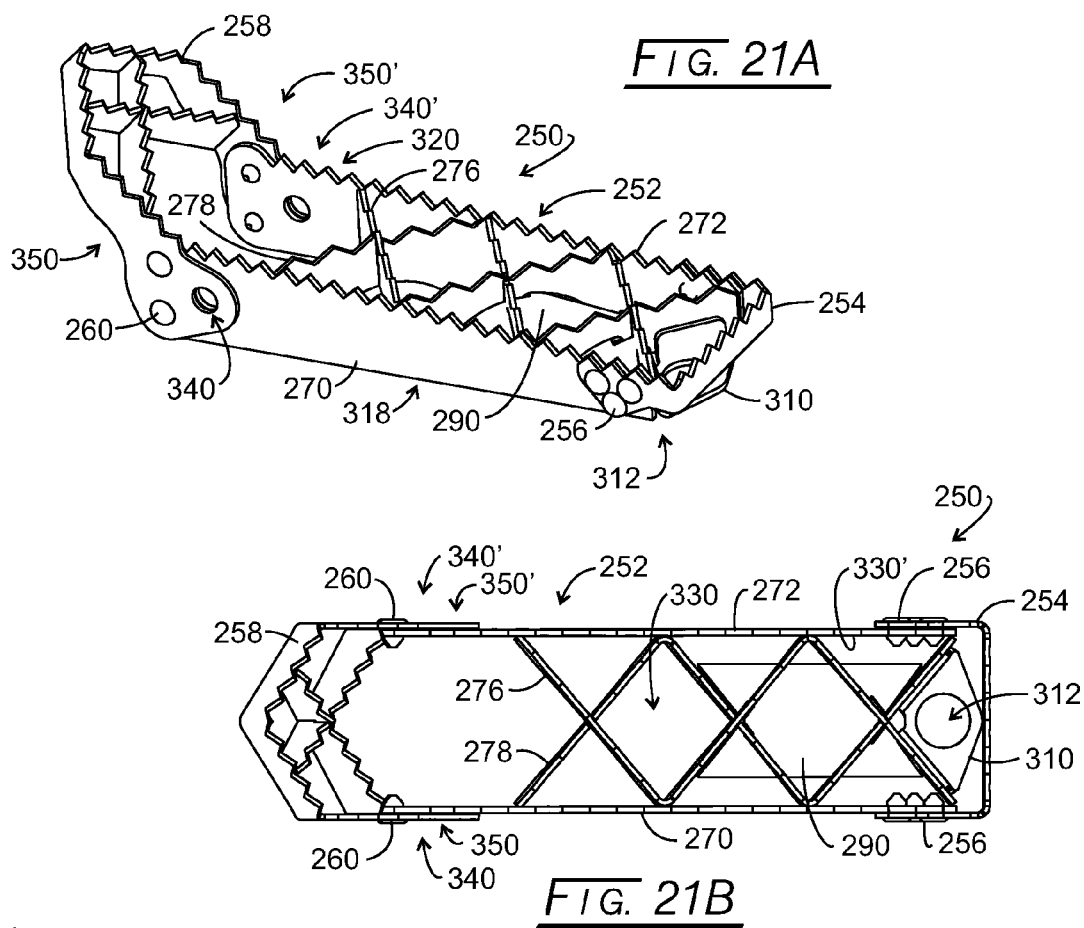
*FIG. 21A*
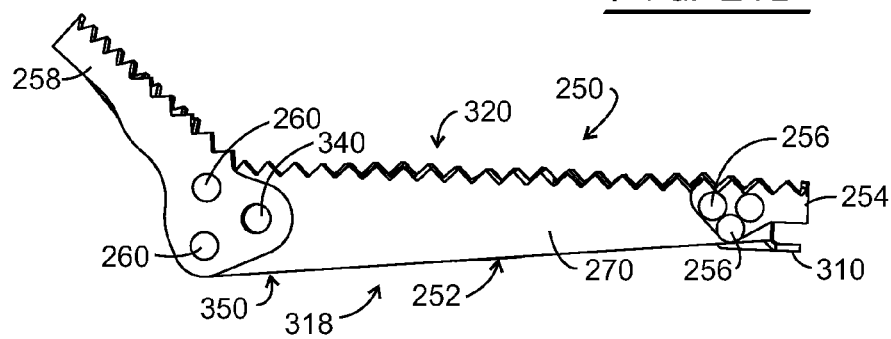
*FIG. 21B*
*FIG. 21C*
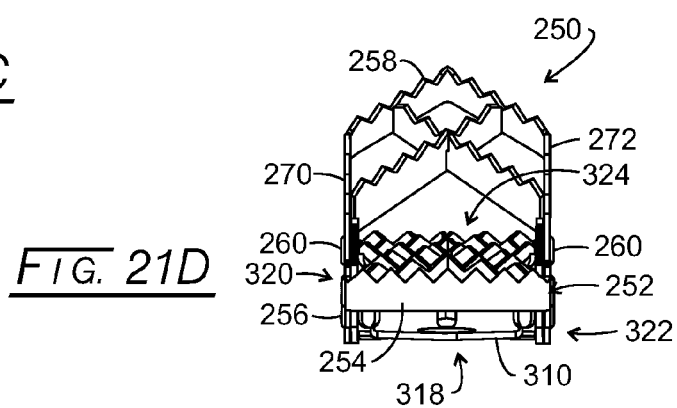
*FIG. 21D*

GUARD BAR AND TUNABLE FOOTPEG SYSTEM FOR ALL-TERRAIN VEHICLES

CROSS-REFERENCE TO RELATED APPLICATIONS

This application claims priority to U.S. Provisional Patent Application Ser. No. 61/340,107 filed Mar. 12, 2010, the disclosure of which is hereby incorporated by reference.

STATEMENT REGARDING FEDERALLY SPONSORED RESEARCH

Not applicable.

BACKGROUND

The sport of motor vehicle racing commenced shortly following the introduction of motorized vehicles. This holds true for motorcycles, the currently more popular racing venues involving dirt bikes driven over terrain courses wherein driver and bike typically are launched into airborne orientations over significant heights and distances. Sporting motorcycles were popular at the beginning of the 20th century. For instance, at that time Harley-Davidson marketed a lightweight bike powered by a 3-horsepower, 25-cubic inch one cylinder engine. Another racing model of that period utilized a V-Twin engine putting out 3½ horsepower. The 120 pound vehicle had a then innovative twist-grip throttle and could reach speeds of about 60 miles per hour.

While the current dirt bikes are being raced, the driver's feet will be engaging a foot support referred to as a "footpeg" extending rigidly outwardly from the frame. When these vehicles descend from a launch to impact terrain, traumatic forces often are imparted to the driver's legs through the footpegs notwithstanding the shock absorbers associated with the wheels of such vehicles.

In 1967, the American counterpart to a global motorcycle manufacturer requested the development of a vehicle that its dealers could sell during the winter season of slackening motorcycle sales. The result was the introduction of a 3-wheel all-terrain vehicle (ATV) that debuted in 1970. This original ATV exhibited a tricycle geometry and employed a 7-horsepower motorcycle engine to drive two rear twenty-two inch low pressure tires through a dual-range, four-speed gear box with an automatic clutch. The machine handled snow, mud and various slippery conditions which a motorcycle could not.

Further development optimized tire and chassis design and while the vehicles were considered basically a recreational device, multipurpose usage developed. A major interest for ATVs in the 1980s was racing, everywhere from frozen lakes in the East, to Western deserts, to dirt ovals in Middle America. Four-wheel machines were introduced in 1984 and were considered more versatile, particularly for utilitarian use. Inevitable accident statistics prompted the Consumer Product Safety Commission (CPSC) to mandate a four-wheel design. By 2001, the ATV industry was selling about 400,000 units per year.

Four-wheeled ATV vehicles utilized in racing are generally referred to as "sport quads". Such sport quads incorporate two-wheel drive, somewhat expensive suspensions and more refined motors. Typically weighing about 370 pounds, the sport vehicles are quicker and more responsive than utility associated models. As in the case in dirt bike racing, when participating in a racing venue, the sport quads generally will from time-to-time be launched into an airborne orientation. During such performance, the driver's feet are supported upon the earlier-described footpegs extending rigidly outward from the vehicle frame. As before, when the sport-quads descend from a launch and impact the racing venue terrain, traumatic forces often are imported to the driver's legs through the footpegs, notwithstanding the shock absorbers associated with the forward wheels of the vehicle.

SUMMARY

The present discourse is directed to foot support apparatus or footpegs which are particularly useful with sporting vehicles such as sport quads or dirt bike-type motorcycles. Having shock absorber treated foot contact components, the footpegs improve the avoidance of shock related trauma to a driver's leg structure. Shock absorption supplementing the vehicle's front wheel shock absorbing system preferably is developed in the footpegs through the use of one or more elastomeric cushions, preferably balls or spheres. Accordingly, the extent of shock absorption, inter alia, may be adjusted or tuned to complement driving characteristics by selecting the size, composition and number of the elastomeric spheres.

The foot support apparatus or footpeg is configured with a cradle attachable to the vehicle frame, having a receiver cavity at a foot support region extending at least to a pivot support region. It is within the receiver cavity that the elastomeric balls are selectively positioned. This cradle pivotally supports a foot contact component having an upwardly disposed foot engagable surface and an oppositely disposed biasing surface facing the receiver cavity and incorporating a sequence of elastomeric ball position stabilization indentation segments. Thus, such balls may be consistently positioned to tune the footpeg to accommodate different drivers and/or racing venues.

Preferably, the foot contact component is pivotally mounted to the cradle at an outer location. However, at this spaced location vehicle frame vibration may be transmitted in an amplified manner. Correction is made by employing a pivot shaft assembly configured to absorb vibration and isolate the foot contact component from such vibration.

The cradle and foot contact component are mutually configured to limit the pivotal travel of the latter. This feature also may be employed to compressibly preload the elastomeric balls within the receiver cavity. Accordingly, such preloading also may be used to tune the footpeg to accommodate different drivers and/or racing venues.

Other objects of the disclosure will, in part, be obvious and will, in part, appear hereinafter.

The disclosure, accordingly, comprises the apparatus possessing the construction, combination of elements and arrangement of parts that are exemplified in the following detailed description.

BRIEF DESCRIPTION OF THE DRAWINGS

For a fuller understanding of the nature and objects of the disclosure, reference should be had to the following detailed description taken in connection with the accompanying drawings.

FIG. 9 is a sectional view taken through the plane 9-9 shown in FIG. 8;

FIG. 10 is a sectional view of the footpeg pivot through plane 10-10 of FIG. 9;

FIG. 11 is a sectional view of a guard bar frame through plane 11-11 of FIG. 6;

FIG. 12A-B are perspective and top views of alternative embodiments a guard bar assembly;

FIG. 13 is a perspective view of a footpeg with shock absorbing features;

FIG. 14 is a front view of the footpeg of FIG. 13;

FIG. 21A-D is a series of detail drawings of an alternative footpeg; and

DETAILED DESCRIPTION

Figure 1:
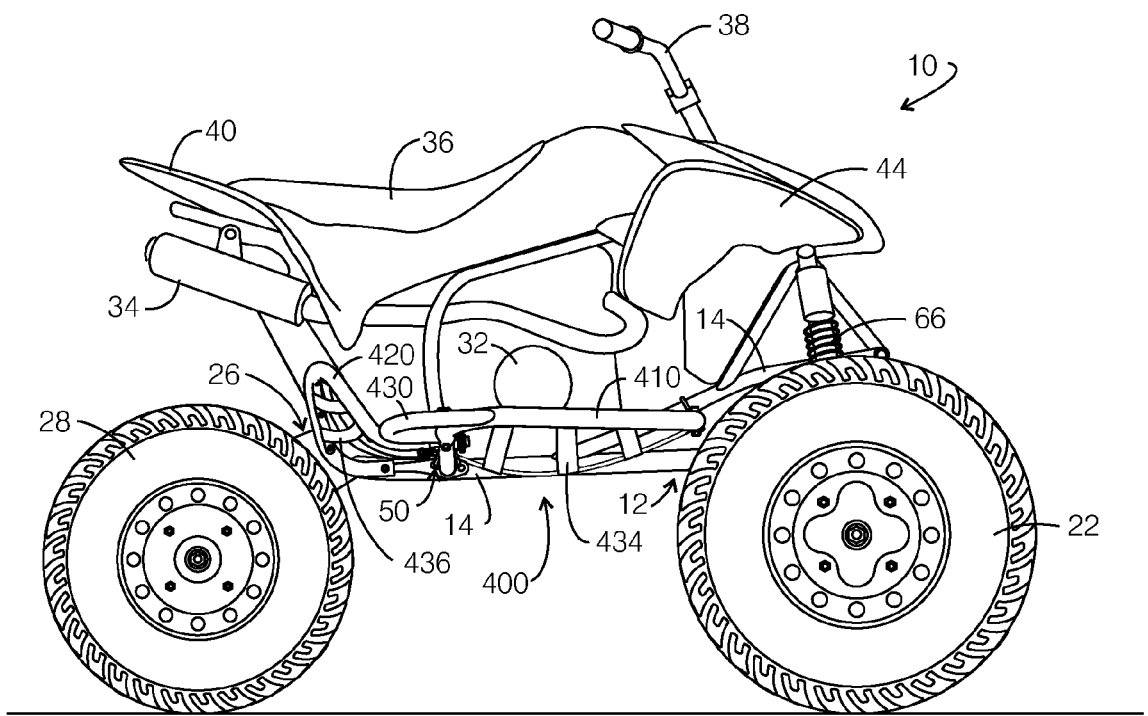
FIG. 1 is a side view of a sport quad all terrain vehicle with protective guard bars.

Referring to FIG. 1, a quad sport-type all terrain vehicle (ATV) is represented generally at 10. For purposes of this disclosure the embodiments claimed herein are applicable to a variety of vehicles carrying riders. Thus, as described henceforth an all-terrain vehicle (ATV) is considered to be a wheeled or tracked vehicle that may be either road worthy, or capable of traveling across a variety of surfaces, such as earth, water, snow, ice or the like. Preferably an ATV has two, three or four wheels, more preferably rubber tired wheels. Vehicle 10 as shown is configured with a tubular frame represented generally at 12, two components of which are represented at 14 and 16. Frame components 14 and 16 are at the right side of vehicle 10. Looking additionally to FIG. 2, complimentary frame components are seen respectively at 18 and 20, as are associated with the left side of the vehicle. These figures reveal right and left forward wheels 22 and 24, which are freely rotatable. A rearwardly directed swing arm 26 (FIG. 1) supports a driven axel along with right and left rear drive wheels, the right drive wheel being seen at 28. The diameter of wheels as at 28 is less than that of the front wheels but generally these wheels will exhibit a wider geometry.

Frame 12 further supports a motor represented schematically at 32 in FIG. 1. Motor 32 incorporates an exhaust pipe and muffler 34. Above the motor 32, the frame 12 supports a rather elongated seat 36 and forwardly thereof handlebars 38. Looking additionally to FIG. 2, associated with the seat 36 are rear fairings 40 and 42 that function somewhat as a rear fender. Correspondingly, front fenders are defined at 44 and 46.

In general, the technique of driving vehicles as at 10 as well as motorcycles and the like in off the road racing involves driver talent. For all-terrain vehicles, particularly of a sporting variety, driver position is used in that vehicle control. To achieve improved racing performance, the driver should be comfortable or have a feeling of confidence in the vehicle. Accordingly, during most of a racing endeavor, both feet will engage the frame 12 at oppositely disposed outwardly protruding foot rests typically referred to as "footpegs". Right footrest 50 reappears in FIG. 2 in conjunction with a corresponding left footrest represented in general at 52.

Figure 2:
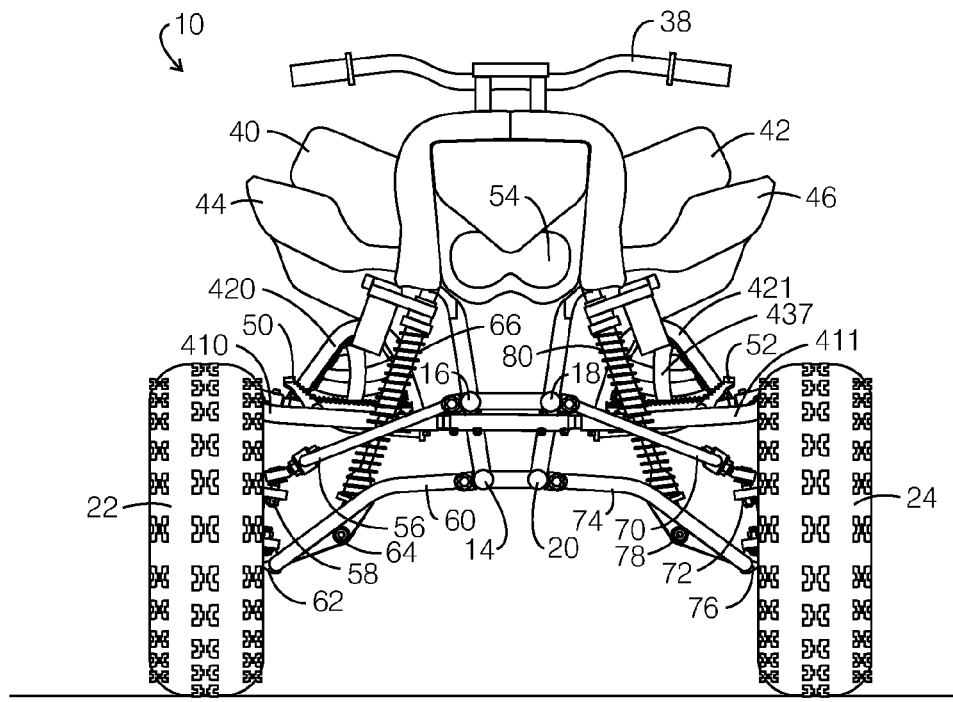
FIG. 2 is a front view of the vehicle shown in FIG. 1.

FIG. 2 reveals frame supported headlights 54 and the general features of the suspension associated with front wheels 22 and 24. In the latter regard, wheel 22 is supported inter alia, by an upper control arm represented generally at 56. Configured as a tubular A-arm, device 56 is pivotally mounted to brackets coupled to frame member 16 and extends to a ball joint assembly represented generally at 58. Wheel 22 is also supported by a lower control arm represented generally at 60 which is pivotally supported from brackets attached, in turn, to frame member 14. Device 60 extends to a ball joint assembly represented generally at 62 and is configured with a connector assembly 64 (sometimes referred to as a knuckle or spindle) which, in turn, is attached to a coil-over shock absorber assembly represented generally at 66, the upper portion of which is attached to frame 12.

In identical fashion, left front wheel 24 is suspended, intra alia, by an upper control arm represented generally at 70 which is pivotally coupled to brackets connected to frame member 20 and extends to an upper ball joint assembly represented generally at 72. A lower control arm is represented generally at 74 which is pivotally attached to brackets extending from frame member 18 and extends, in turn, to a lower ball joint assembly represented generally at 76. Control arm 74 also is configured with a connector assembly 78 which, in turn, is coupled to the lower end of a coil-over shock absorber assembly represented generally at 80.

While vehicle 10 is equipped with coil-over shock absorbing assemblies as at 66 and 80, in general, those shock absorbing assemblies have a somewhat qualified value in providing adequate protection of the drivers legs and feet from the dynamic shock of vehicle operation.

Footrests 50 and 52 are configured to contribute additional shock absorbing and vibration isolating performance for avoiding traumatic shock to the foot and legs of the driver. The amount of this additional shock absorption and vibration isolation is quite adjustable to suit the driving styles of different drivers as well as differing racing venue characteristics.

On occasion, ATVs are utilized recreationally or in racing over terrain that is wooded, covered with scrub, or desert plants, or rough terrain. As shown in FIGS. 1 and 2, guardbar protectors 400, i.e. sidebars or "nerf bars," protect the area between the front and back wheels, and provide the rider additional protection from injury due to intrusion of terrain materials or other objects into the area around the footpegs (and rider's legs). Guard bar protector 400 is comprised of toe guard assembly 410, heel guard 420, and pivot fenders 430, on the right side of the vehicle. Netting 434 and 436, preferably of nylon strap, fill the space inside toe guard assembly 410 and heel guard 420, respectively.

Figure 3:
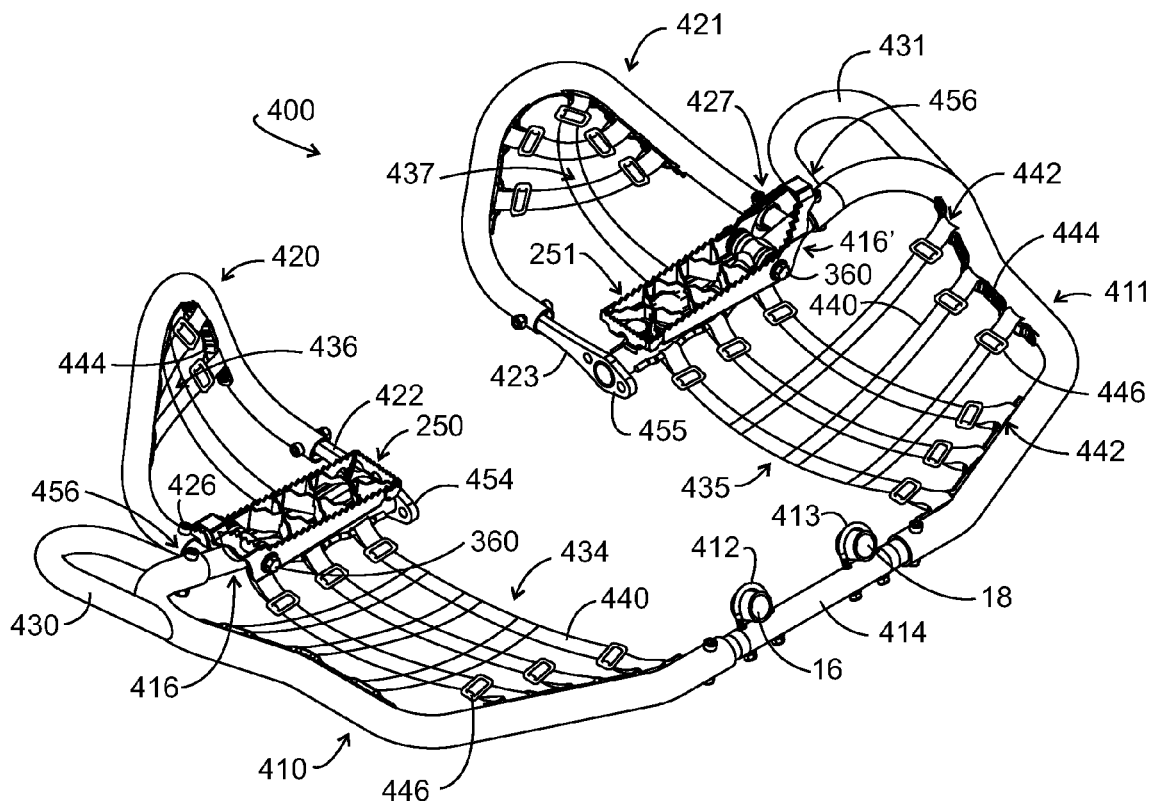
FIG. 3 is a perspective view of a guard bar assembly incorporating a footpeg with shock absorbing features.

Turning now to FIG. 3, a perspective view of an embodiment of the guard bar assembly with two footpegs, 250, 251, each installed on a cradle tree, is shown. Guard bar assembly 400 is of the type known in the trade as a "nerf bar," functioning as a detachable guard assembly to protect the feet and legs of the rider. Toe guard assemblies 410 and 411 are configured to extend from frame bracket 412 and 413 and toe guard union 414 around the toe area of the rider to cradle tree bracket 416, 416'. Frame bracket 412 is shown configured as a U-bolt for fastening to frame members 16 and 18. Those skilled in the art will recognize a number of methods of attaching the guard bar assembly to the vehicle frame are available, including, for instance, a collar welded to guard bar union 414, with a bolt on collar cap retaining the collar around the frame member.

Figure 4:
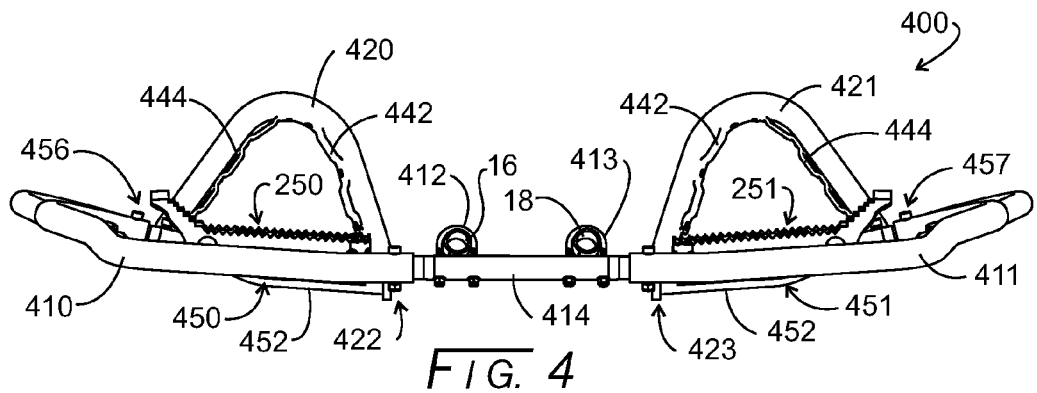
FIG. 4 is a front view of a guard bar assembly with mounted footpeg.

Heel guard 420 likewise extends from frame bracket portion 422 of cradle tree 450, around the heel area of the rider to cradle tree bracket 426 (or as alternatively embodied as heel guard 421 and frame bracket 423). Pivot fenders 430 and 431 are preferably welded to toe assemblies 410 and 411, although alternatively, the pivot fenders could be embodied as detacheable parts, mounting on brackets or bolt locations on the frame assembly. FIG. 4 shows a front view of the guard bar assembly, displaying the features shown in FIG. 3.

The cradle tree 450 functions in part to mount the guard bar assembly to the vehicle, and also to support the footpegs. Cradle tree 450 is comprised of cradle tree shaft 452, and is mountable to the vehicle frame via cradle tree bracket 454, extending laterally to toe guard/heel guard bracket union 456. Cradle tree bracket 416 is preferably embodied as an integral part of the cradle tree, as discussed further below, in relation to FIGS. 7-9. Footpeg component 250 is pivotally mounted with cradle tree 450 using a pivot shaft assembly located generally at 360. (See FIG. 3).

FIG. 3 displays the arrangement of protective netting 434, 435 and 436, 437 filling the space inside toe guard assembly 410 and heel guard 420, respectively. Nylon strap material 440 or other flexible material with high tensile strength and providing moderate shock absorption, are sewed into a grid pattern, and the free ends pass through frame eyelets 442 and are adjustably tightened using buckles 446 or the like. Frame eyelets 442 can be formed of loops of heavy wire or tubing, welded to the frame to form a loop sized to allow passage of nylon strapping 440. In a preferred embodiment, frame eyelets 442 are formed by eyelet bar 444, as a single bar, bent to form eyelets, and then affixed to the frame assembly by welding, or preferably by blind rivets.

Figure 5:
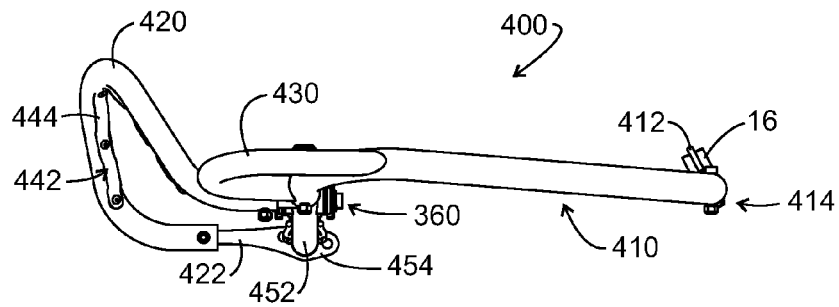
FIG. 5 is a side view of a guard bar assembly with mounted footpeg.

FIG. 5 shows a right side view of the assembly shown in FIG. 3. Guard bar assembly 400 is comprised as toe guard assembly 410 extending from frame bracket 412 and toe guard union 414 attaching to vehicle frame member 16, around the toe area to cradle tree 450 and cradle tree toe bracket 416. Pivot fender 430 is shown welded to the rear of toe guard assembly 410. Heel guard 420 extends from frame bracket portion 422 of cradle tree 450, around the heel area of the rider to cradle tree bracket 426. The heel guard is shown attached to the frame bracket 422 and cradle tree bracket by bolts passing through the tubular heel guard through hidden holes in the brackets. It is preferred that the bolts be used with locking nuts, or rivets or driven pins be employed. The cradle tree 450 is primarily hidden in the view shown in FIG. 5, although cradle tree shaft 452 and cradle tree bracket 454 are visible. Footpeg pivot shaft assembly is located at 360. Also shown in relation to the heel guard 420 are eyelets 442 and eyelet bar 444, attached to the heel guard with blind rivets.

Figure 6:
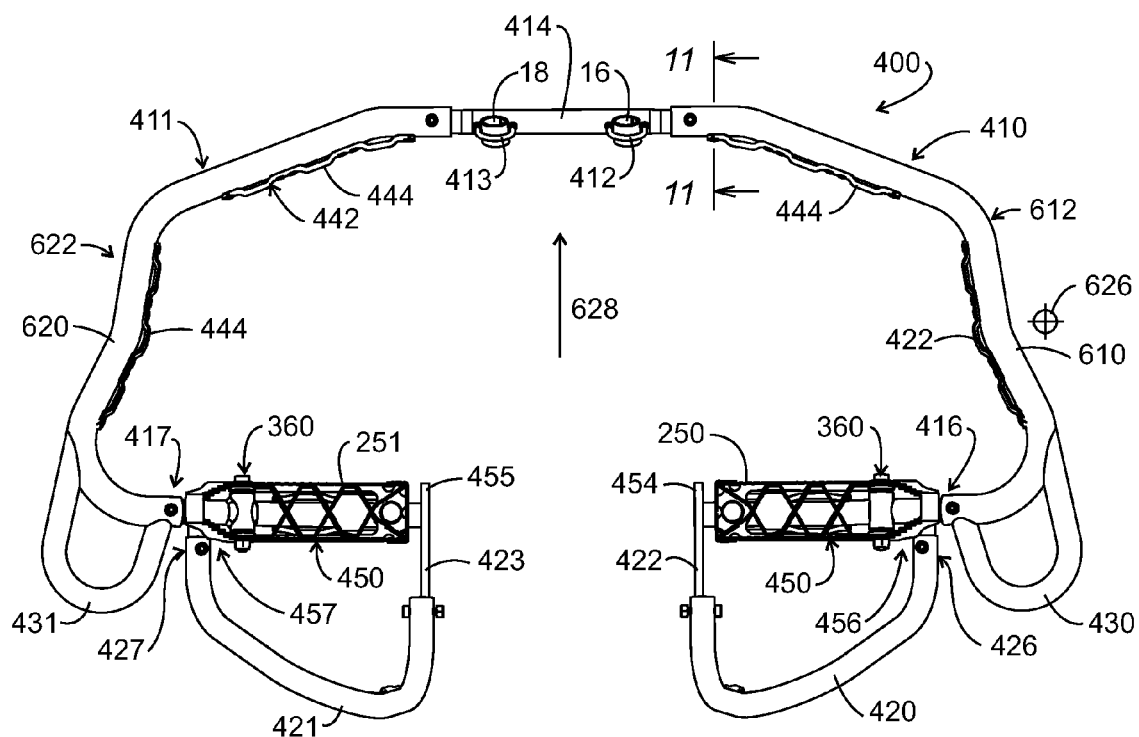
FIG. 6 is a top view of a guard bar assembly incorporating a footpeg with shock absorbing features.

Turning now to FIG. 6, a top view of the embodiment of the assembly shown in FIGS. 3-5 is shown. Guard bar assembly 400 is comprised of toe guard assembly 410 extending from frame bracket 412 and toe guard union 414 around the toe area of the rider to cradle tree bracket 416. Heel guard 420 likewise extends from frame bracket 422 around the heel area of the rider to cradle tree bracket 426 (or as alternatively embodied as heel guard 421 and frame bracket 424) Cradle tree 450 is comprised of cradle tree shaft 452, and is mountable to the vehicle frame via cradle tree bracket 454, extending laterally to toe guard bracket union 456. Footpeg component 250 is pivotally mounted with cradle tree 450 using a pivot shaft assembly located generally at 360.

Figure 7:
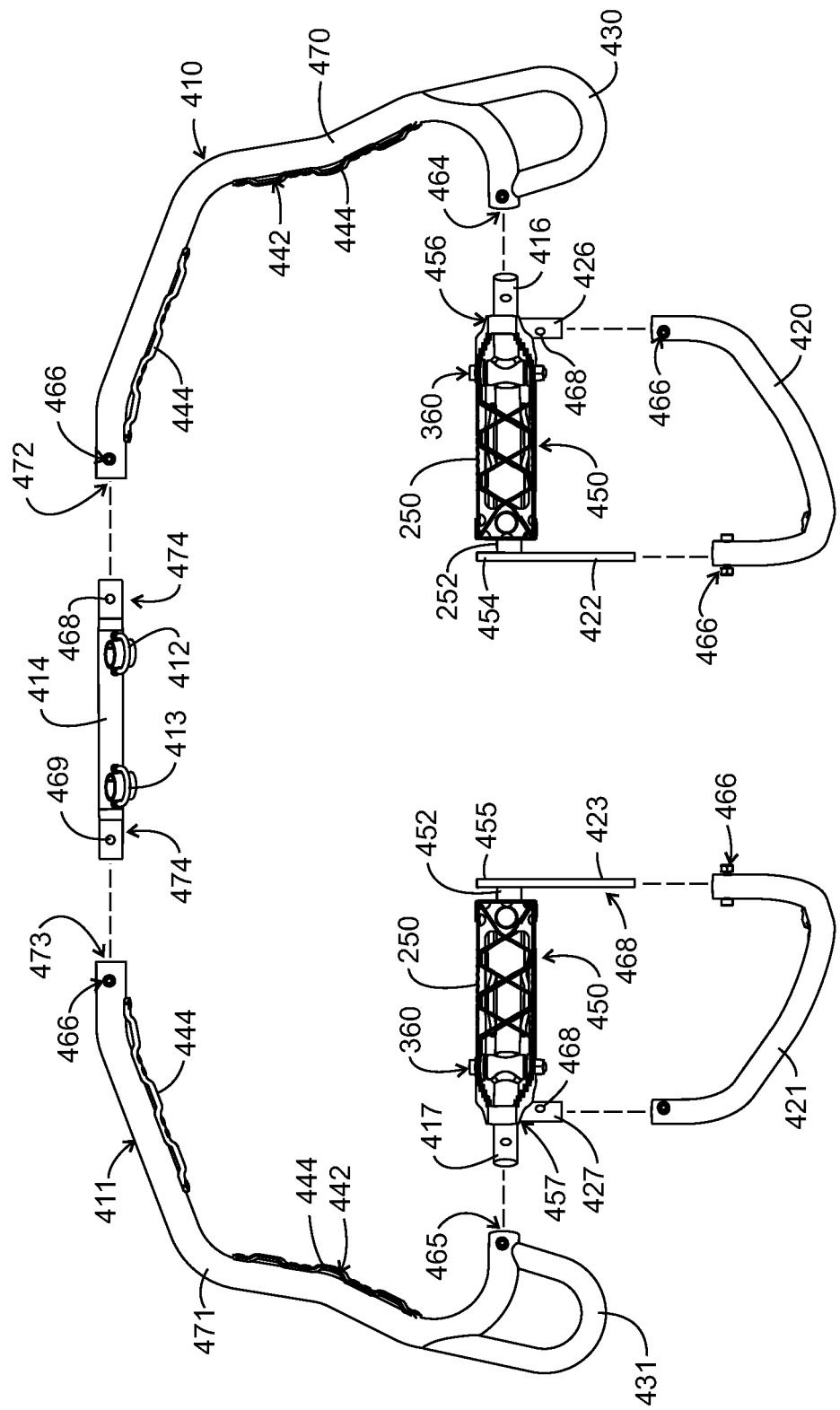
FIG. 7 is an exploded view of the components of a guard bar assembly incorporating a footpeg.

FIG. 7 shows an exploded top view of the components comprising the guard bar assembly shown in FIG. 6. Guard bar assembly 400 is comprised of toe guard assembly 410 and 411 extending from toe guard union socket end 462 and 463 around the toe area of the rider to cradle tree bracket socket 464 and 465. Bolt 466 or rivets are employed to allow disassembly of the guard bar system if the need arises. Toe guard assembly 410 is provided with strap attachment points, configured as strap bars 444, bent to form strap eyelets 442. Strap bars 444 can be preferably configured to have two rivets between each strap eyelet, thus allowing rivets to act cooperatively to securing strap bar 444. As shown in FIG. 7 each eyelet on toe guard assembly 410 has a minimum of three rivets securing the ends of each eyelet. The toe guard assembly is further configured with pivot fender 430 welded to the rear facing bend in the toe guard assembly. Thus, the toe guard assembly 410 as shown in FIG. 7 is comprised of four fabricated pieces, a tubular toe guard, 470, a formed pivot fender 430, welded or bolted to toe guard 470, and two strap bars 444, formed to have eyelets and welded, or bolted or riveted to holes along the interior surface of toe guard 470.

Heel guard 420 likewise extends from frame bracket 422 around the heel area of the rider to cradle tree bracket 426 (or as alternatively embodied as heel guard 421 and frame bracket 423) The ends of heel guard 420 act as sockets for sliding on the stud end of cradle tree bracket 426, for instance, and the plate of frame bracket 422. Bolts 466, are configured to pass through holes in the heel guard and through bolt holes 468 in the brackets. Toe guard union 414 is configured with stud ends 474, sized to fit snugly in the toe guard socket ends 462, 463. Cradle tree 450 is shown with a cradle tree shaft 452, mountable to the vehicle frame via cradle tree bracket 454, extending laterally to toe guard bracket union 456, branching to toe guard bracket 416 and heel guard bracket 426.

Figure 8:
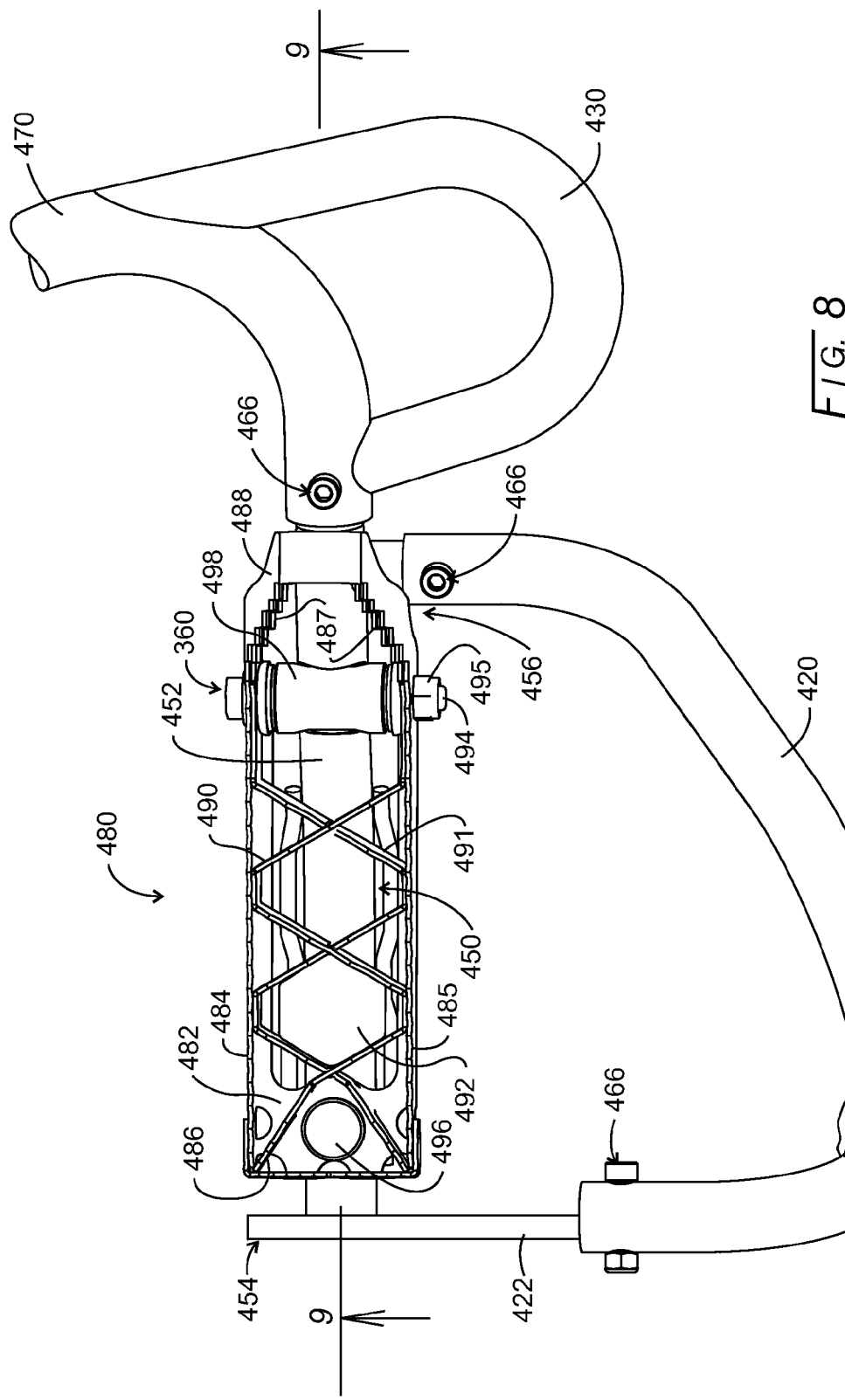
FIG. 8 is a detail top view of a guard bar cradle tree and footpeg assembly.
Figures 15, 16:
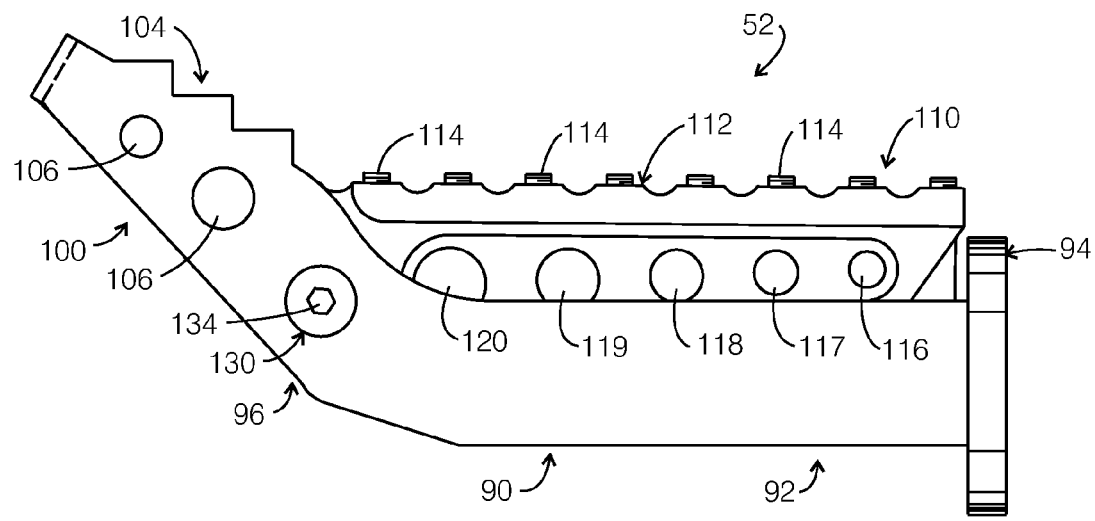
FIG. 15 is a side view of the footpeg of FIG. 13.
FIG. 16 is a top view of the footpeg of FIG. 15.

FIG. 8 shows a detail of cradle tree region of the guard bar assembly shown in FIGS. 6 and 7. Cradle tree 450 provides a rigid and robust junction of the guard bar assembly, a mounting location for foot pegs, and a system for securing the entire assembly to the vehicle frame. A single plate is mounted to the end of cradle tree shaft 452, acting as both a frame bracket and an extended tail that is used as a mounting location for the heel guard, as heel guard bracket 422. The cradle tree union 456, provides for attachment of stud ends 416 and 426, mounting locations for heel guard 426 and toe guard tube 470.

An embodiment of a footpeg, as footpeg 480 is also shown in FIG. 8. Footpeg 480 is formed from steel sheet, and can be cut via laser into the desired shape. As shown in FIG. 8, footpeg 480 can be formed from 5 components, and welded into a rigid frame. From one flat sheet 482, side rails 484 and 485 are folded at a right angle, for instance, to the sheet plane. Perpendicular to side rails 484 and 485, end cap 486 is folded at a right angle to the original sheet plane, and ears are folded over the ends of side rails 484 and 485. The end cap can be spot welded to the side rails, or riveted if so preferred. Heel ends 487 are folded at an acute angle, and then mated with the complementary folds of heel clip 488, and secured by welds or rivets. Two cross braces, 490 and 491 are folded into a cross pattern, interlaced, and then welded to the side rails and bottom sheet. Finally ball cup 492 provides a location for a cushioning ball or spring assembly to cushion the foot peg against the cradle tree. The foot peg is mounted to the cradle tree by passing bolt 494 along pivot axis 360 through the footpeg and the cradle tree pivot 498, and secured in place by locking nut 495. Motion limiter bolt 496 passes through the footpeg toe plate, and screws into threaded cradle tree limiter insert 497, limiting the upward movement of the footpeg about the cradle tree pivot. Shock absorbing ball 499 is retained between footpeg ball cup 492 and cradle tree ball cup 501.

FIG. 9 reveals a longitudinal cross section of cradle tree assembly 450 and footpeg along axis 9-9 of FIG. 8. Pivot assembly 360 of cradle tree 450 is shown supporting foot peg 480. Footpeg 480 reveals side rails 484 and 485 is shown folded at a right angle to the footpeg bottom sheet plane, and ears on end cap 486 are folded over the end of side rail 484. Heel end 487 is mated with the complementary folds of heel clip 488. A portion of cross brace 491 is shown, in relation to ball cup 492. Foot peg 480 is mounted to the cradle tree by bolt 494 through the footpeg and the cradle tree pivot 498. Motion limiter bolt 496 passes through the footpeg toe plate, and screws into threaded cradle tree limiter insert 497, limiting the rotational movement of the footpeg about the cradle tree pivot. Shock absorbing ball 499 is retained between footpeg ball cup 492 and cradle tree ball cup 501.

Cradle tree 450 components shown comprise cradle tree shaft 452, frame bracket 454, toe guard stud 416, and cradle tree pivot 498. Toe guard frame 470 is mounted on the end of the cradle tree stud 416 in toe guard socket 464, and held in place by bolt 466 and locking nut 467.

Looking to FIG. 10, a cross section of pivot shaft assembly 360 along line 10-10 of FIG. 9 is shown. Footpeg 480 is pivotally mounted with cradle tree 452 using a pivot shaft assembly represented generally at 360. As seen in FIG. 8, the shaft component of assembly 360 is provided as a button-head bolt 494 which passes through cradle tree pivot 498. The passage of bolt 494 through and attachment to cradle tree pivot 498 is retained by pivot nut 495. FIG. 10 reveals that assembly 360 is supported by resilient component 370 which is located within cradle receiver cavity 365 and may be in compressive contact with the biasing surface inner surface of cradle tree pivot 498. Pivot sleeve 372 is formed of rigid material, such that tightening of nut 495 onto bolt 494 compresses component 370 between sleeve 372 and pivot 364. Component 370 preferably is provided as a conical shape which functions as a shock absorber to shock dynamics otherwise imposed foot peg 250. Compression of component 370, (i.e. compression sleeve 370) stabilizes footpeg 480 while providing for an increasingly rigid assembly as nut 495 is tightened.

FIG. 11 shows a cross section of toe guar union 414 and toe guard 410 along axis 11-11 of FIG. 6. Stud end of toe guard union 414 fits into the socket end of toe guard 410, and is secured by bolt 466, passing through complementary holes in toe guard frame 470 and toe guard union 414 stud end. A portion of vehicle frame member 16 is shown, with toe guard union shackle 412 being provided to secure (in part) the guard bar assembly to the vehicle frame. From the opposite end of toe guard union 414, frame member 471 of left toe guard assembly 411 is revealed. Eyelet bar 444 is shown formed to provide mounting surfaces, secured to the toe guard frame 471 by rivets, interrupted by eyelets 442. As shown in cross section rivets 445 pass through eyelet bar 444, and penetrate into the cavity of toe guard frame member 470.

As shown in the embodiment of guard bar assembly 400 shown in FIGS. 3 through 7, the guard bar assembly 400 is configured with a pivot, 610, which allows the vehicle to approach a fixed object, such as a tree or pole, and utilize the contact between the guard bar pivot and the object to function as a rotational axis to assist the vehicle in navigating a minimum radius turn around the object. Pivot 610 may be optionally configured with a gathering region 612, to assist the rider in effectively engaging an object in pivot 610. Pivot 620, on the opposite guard bar is shown with gathering region 622. Thus, imparting forward motion 628, as the vehicle bears against a fixed object, will result in rotation of the vehicle about axis 626, protecting the rider, while providing a close turning radius about the fixed object. The provision for heel guard 430 effectively fills the space between the guard bar assembly and pivot point and the rear wheel of the vehicle. FIG. 1 demonstrates the position of the heel guard in relation to pivot 610, wherein, a fixed object is effectively preventing from lodging against the rear tire 28, or engaging into the space between the guard bar assembly 400 and the rear tire 28.

FIGS. 12A and 12B demonstrate an alternative embodiment of the guard bar assembly as assembly 600, with primarily the same configuration as guard bar 400, except for the absence of the additional features of gathering region 612 and pivot 610. As shown, assembly 600 rather than having the heel guard mate with the base of the cradle tree, provides for the heel guard mating directly to the vehicle frame at brackets 422' and 424'. Eyelets 442 are formed by welding rod onto the frame members to form eyelets 442.

The discourse now turns to details of a variety of embodiments of footpegs. Looking to FIG. 13, one embodiment of footrest or footpeg 52 is represented in perspective at an enhanced scale. Footpeg support apparatus 52 is seen to be configured with a variation of a cradle tree as a cradle represented generally at 90. Cradle 90 is formed with a foot support region represented generally at 92 which extends in general from a frame engagement component represented generally at 94 to a foot support end portion or pivot support portion represented generally at 96. Within foot support portion 92 there is provided a receiver cavity represented generally at 98. Beyond foot support end portion or pivot support portion 96, cradle 90 extends as represented generally at 100 outwardly and upwardly to define a ramp 100 which functions to bias a drivers foot toward the foot support region 92. Note that ramp 100 is configured with steps or ratchets as represented generally at 102 and 104 to promote this foot positioning. Weight reducing openings 106 are shown provided within ramp 100.

Figure 17:
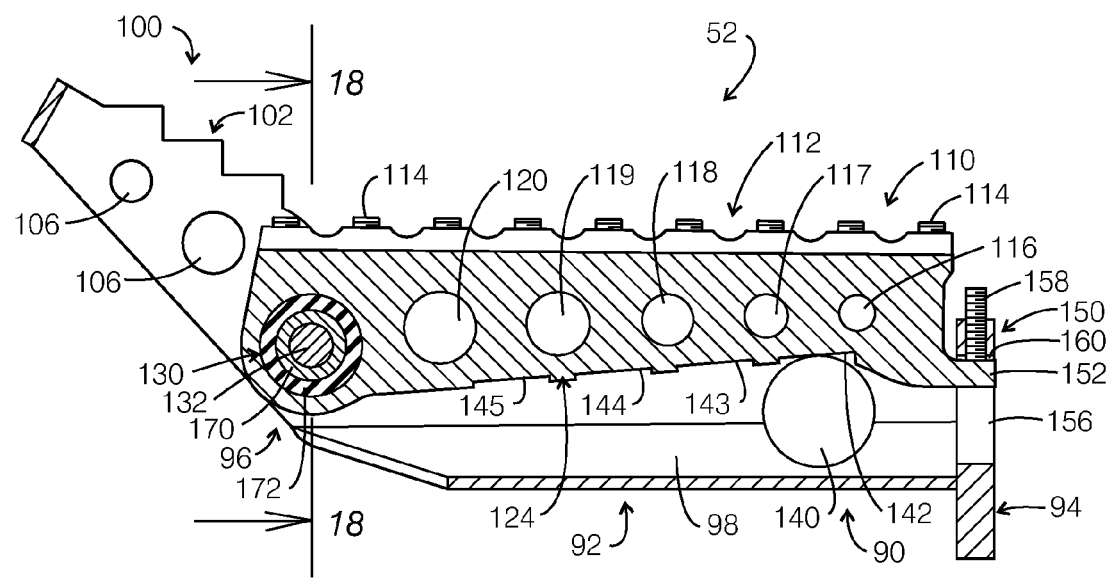
FIG. 17 is a sectional view taken through the plane 17-17 shown in FIG. 14.

A foot contact component represented generally at 110 is supported by the cradle 90 generally over cradle foot support region 92 and associated receiver cavity 98. Component 110 generally extends from the pivot support or foot support end portion 96 to general adjacency with the frame engagement component 94. As shown in FIG. 13, contact component 110 has a generally planar upper surface, to bear against the foot (or boot) of the rider. It is formed with an upwardly disposed foot engagable surface represented generally at 112. As seen additionally in FIGS. 14, 15 and 16, surface 112 may be formed in a variety of configurations promoting foot contact. For the instant embodiment, surface 112 is formed as a grid of ridges each of which carries a small steel hex nut, certain of which are identified at 114. As particularly seen in FIG. 15, contact component 110 is configured with weight reducing bores 116-120 and incorporates a lower disposed biasing surface or portion represented generally at 124 as seen in FIGS. 14 and 17. Component 110 is pivotally mounted with cradle 90 using a pivot shaft assembly represented generally at 130. As seen in FIGS. 13-16, the shaft component of assembly 130 is provided as a button-head bolt 132 which passes through cradle 90 and, as illustrated in connection with FIG. 15, the head of bolt 132 incorporates a hex-shaped recess 134. The passage of bolt 132 through and attachment to cradle 90 is illustrated in FIG. 18.

Figure 18:
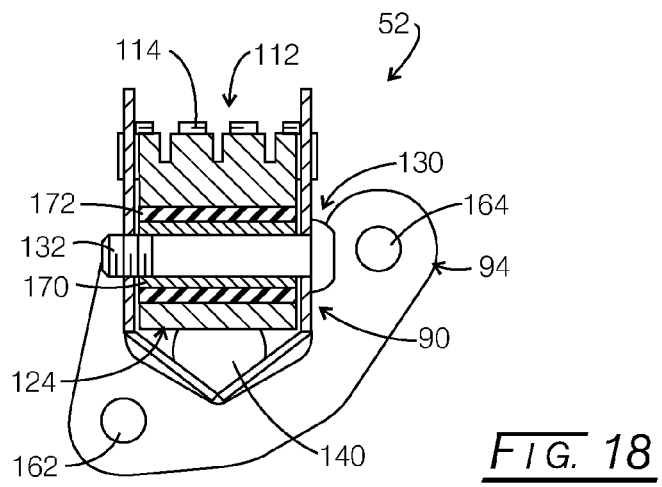
FIG. 18 is a sectional view taken through the plane 18-18 shown is FIG. 17.

FIGS. 14, 17 and 18 reveal that a resilient component 140 is located within cradle receiver cavity 98 and may be in compressive contact with the biasing surface 124. Device 140 preferably is provided as an elastomeric ball or sphere which functions as a shock absorber to shock dynamics otherwise imposed at foot contact surface 112. Note in FIG. 17 that biasing surface 124 is configured with a succession of positioning segments or shallow cavities 142-145. These segments 142-145 function to locate the resilient ball 140 consistently. Additionally, the ball 140 may be located at a select one of these segments in accordance with the racing characteristics of a given driver or racing venue.

FIGS. 13 and 17 reveal a motion limiter represented generally at 150 which limits the extend of foot contact component 110 pivotal movement. In this regard, the foot contact component 110 is configured to derive an inwardly depending integrally formed contact surface 152 representing the top of a tab or the like. Surface 152 extends within a travel limiter opening 156 of the frame engagement component 94. Above the opening 156 there is provided a pre-load adjustment member 158, here implemented as a set screw with a contact portion 160 (FIG. 17) engaging surface 152. Note additionally with respect to FIGS. 13, 14 and 18 that mounting bores 162 and 164 are formed within the frame mounting component 94.

While the pivot shaft assembly 130 may, for instance, be located adjacent frame mounting component 94, it has been determined to be preferable to located it as shown in the instant figures. However, such a positioning tends to amplify frame vibration. Accordingly, pivot shaft assembly 130 is configured to absorb vibration and generally isolate the foot contact component from such vibration. Looking to FIGS. 17 and 18, bolt or shaft 132 is seen to be extending through an open cylindrical bushing 170. However, bushing 170, in turn, is mounted within an outwardly disposed resilient member 172 engaged with the foot contact component 110 and the noted bushing 170. Resilient member 172 is configured as an elastomeric open cylinder.

Figure 19:
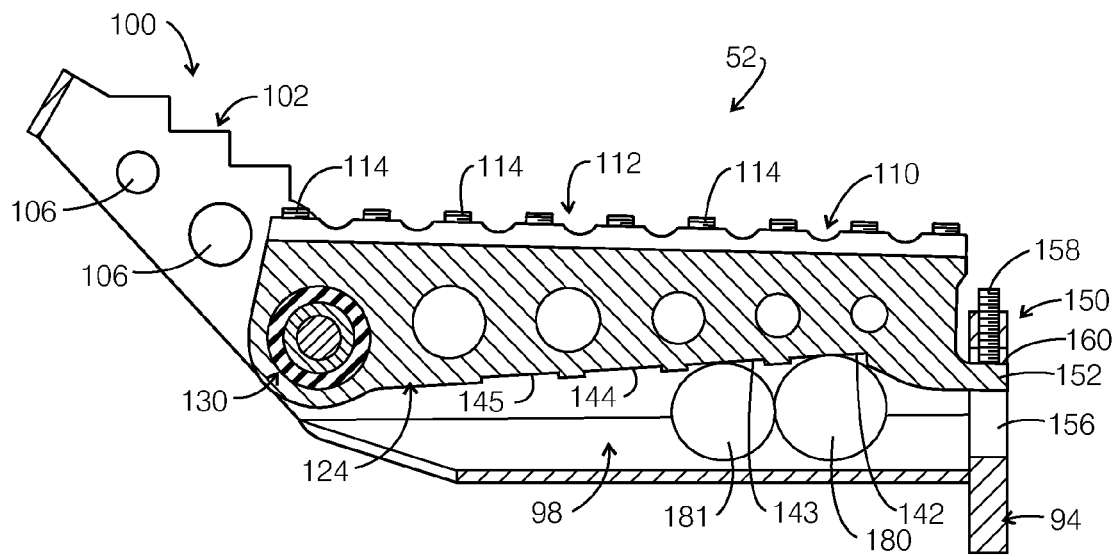
FIG. 19 is a sectional view similar to FIG. 17 but showing the utilization of two elastomeric shock absorbing spheres.
Figure 20:
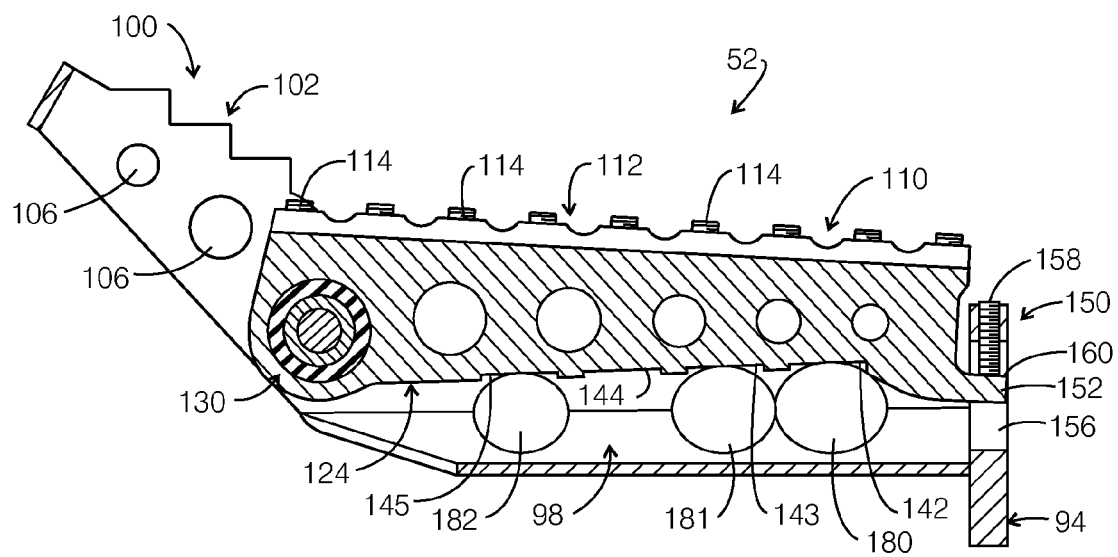
FIG. 20 is a sectional view similar to FIG. 17 but showing the utilization of three elastomeric shock absorbing spheres.

The shock absorbing resilience of foot support assemble or footpegs as at 52 may be readily accommodative to adjust the drivers needs. This can be carried out by the extent of preloading applied at motion limiter 150. Additionally, however, more than one elastomeric sphere or ball may be utilized and those resilient members may vary in diameter. For example, looking to FIG. 19, two elastomeric balls or spheres are employed as at 180 and 181. In this regard, sphere or elastomeric ball 180 is captured by the segment 142 biasing surface or portion 124 while elastomeric ball 181 is captured by the next adjacent segment 143. Ball 181 is shown to be compressed slightly more that ball 180 and note, additionally, that set screw 158 has been adjusted to move contact surface 152 downwardly within travel limiter opening 156. Thus, resilient members 180 and 181 are preloaded to adjust the shock absorbing response of footpeg 52. Looking to FIG. 10, elastomeric spheres or balls 180 and 181 reappear in combination with elastomeric sphere or ball 182 which is carried by outwardly disposed segment 145. Elastomeric balls 180-182 are preloaded even more by adjustment of set screw 158 to drive contact surface 152 further downwardly within travel limiting opening 156.

Looking to FIG. 21, an preferred alternative embodiment of footrest or footpeg 52 is represented in views A-D at an enhanced scale. Footpeg support apparatus 250 is seen to be configured with a platform cradle component 252, an inboard clip 254, fastened to platform component 252 by fasteners 256, and outboard clip 258 fastened to platform component by fasteners 260. As shown in FIG. 21, footpeg 250 is configured to be ambidextrous, functioning equally well when installed as a right-hand footpeg and a left-hand footpeg. Moreover, the skilled artisan will recognize that a number of fastening mechanisms are available, including welding, spot welding, injection molding, casting, and screw type fasteners, as shown. Component 250 is shown as a preferred embodiment, wherein the inboard clip and outboard clip are modular, and a particular clip sized and adapted to the given application may be chosen to fit a particular model of ATV, or to provide other specialized configuration. The modular clips allows a limited number of component parts to be assembled into a wide variety of footpegs.

Turning more specifically to the configuration of platform cradle component 252, platform cradle component 252 is formed with a right rail 270 and a left rail 272, separated by cross-braces 276 and 278 which are rabbeted together to form an "x" pattern, and separating the right rail and left rail. As shown in perspective view FIG. 21A, and side view FIG. 21C, the upper surface 320 of platform cradle component 252 is configured with gripping serrations, while the lower surface 318 is not serrated, as the foot of the rider contacts the upper surface 320. Disposed to open towards lower surface 318 is ball tray 290, affixed to and supported by the lower surface of cross-braces 276 and 278. Ball tray 290 is shown in top view FIG. 21B and perspective view FIG. 21A, having a convex upper surface, and a concavity facing the lower surface, sized to accept a compression ball of elastomeric construction. Preloader bracket 310 is configured with pretensioner bolt aperture 312, configured to accept passage of a pretensioner bolt, and allowing the tightened bolt head to bear against preloader bracket 310.

Looking to FIG. 21D appears a preferred embodiment of the footpeg 250. As shown, the depth of the footpeg platform is less at both right edge 320, at right rail 270 and at left edge 322 left rail 272, than it is at center region 324. Thus, the top surface 320 of footpeg 250 is convex between the right edge and left edge (i.e., front to back). Likewise, the footpeg may be constructed with an upper surface 320 that is convex between inboard and outboard edges.

A number of features disclosed in FIG. 21 are beneficial for minimizing the amount of debris that may accumulate on the top surface 320 of footpeg 250. Debris dropouts 330 and 330' allow any mud, water or other debris to drop through top surface 320, or to be easily cleaned off, for instance with a stream of water. Moreover the upper surface of ball tray 290 is convex and configured so that no debris is likely to lodge on the top of ball tray 290.

The foot support region of footpeg 250 extends in general, from outboard clip 258, to a pivot, 340 formed by pivot support portion represented generally at 350. A pivot pin (not shown in FIG. 21), is engaged through pivot support portion 350 and 350'. The foot support region of footpeg 250 extends inboard from pivot support portion 350 to inboard clip 254 to general adjacency with the vehicle frame adjacent to inboard clip 254.

Figure 22:
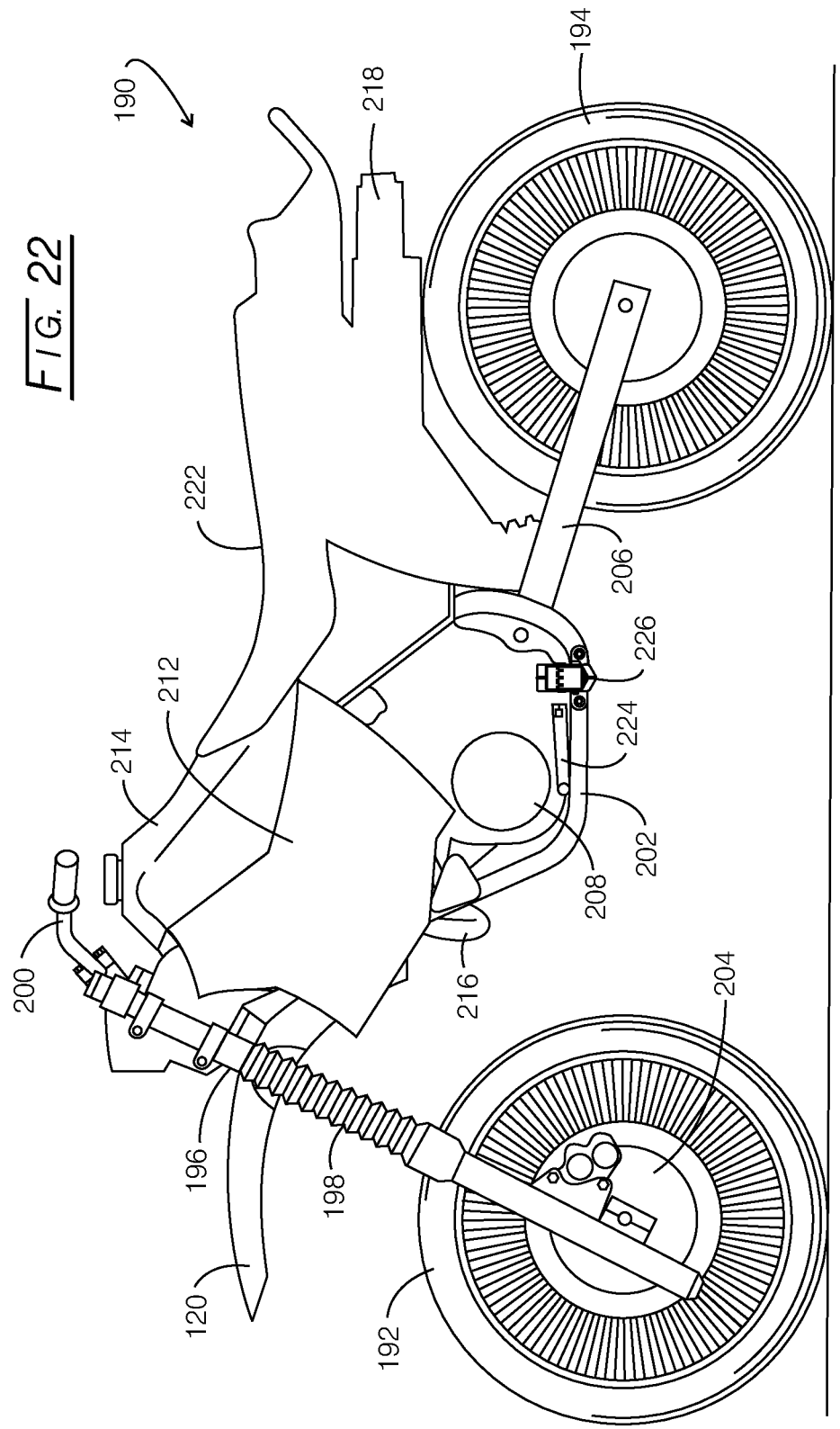
FIG. 22 is a side view of a sport motorcycle incorporating a footpeg according to the disclosure and having portions shown in silhouette fashion in the interest of clarity.

Shock absorbing footpeg devices as described above have important use with any vehicle requiring a footrest and otherwise capable of imposing traumatic dynamic forces into the legs of a driver. One such vehicle is a sporting motorcycle. sometimes referred to as a "dirt bike". Looking to FIG. 22, such a vehicle is represented in general at 190. Vehicle 190 is seen to include a spoked front wheel, 192 as well as a spoked rear wheel 194. Front wheel 192 will be supported in general by a fork structure which may include, for example, shock absorbers, one of which is shown at 196 having a dust cover 198. The noted fork extends to steering connection with handle bars 200 and the assemblage is united by a tubular frame, a component of which is shown at 202. A disc brake 204 is shown operably associated with front wheel 192. Rear wheel 194 is supported by a rear suspension schematically represented for one side at 206. Frame 202 supports a motor 208 which is partially covered by side shrouds as at 212 which extend up to adjacency with a fuel tank 214 and a forward exhaust pipe component associated with motor 208 is shown at 216, the rearwardly extending components of that exhaust system being shown in silhouette at 218. Dirt excursions emanating from front wheel 192 are deflected by a front fender 220 and a rather lengthy or elongate seat is shown in silhouette at 222. A foot actuated gear shifter leaver is shown at 224 located just forwardly of a shock absorbing footpeg or footrest 226 extending outwardly from frame 202. Footpeg 226 is configured in the same manner as described above in connection with FIGS. 13-20. However, some drivers will wish to reconfigure the connection of the footpeg 226 with the frame 202 such that it can be pivoted upwardly about frame 202 to avoid ground contact during more rigorous turns.

Since certain changes may be made to the above apparatus without departing from the scope of the disclosure herein involved, it is intended that all matter contained in the above description or shown in the accompanying drawing shall be interpreted as illustrative and not in a limiting sense.

The invention claimed is:

1. Foot support apparatus for a wheeled vehicle having a driver supporting frame with a foot support connection position, comprising:
   a cradle having a receiver cavity at a foot support region extending from a frame engagement component to a pivot support portion, said frame engagement component being attachable with said frame at said foot support connection position;
   a foot contact component having an upwardly disposed foot engagable surface, an oppositely disposed biasing surface and extending from an outer end generally over the receiver cavity along said foot support region from the pivot support portion to a motion limiter in general adjacency with the frame engagement component;
   a pivot shaft assembly pivotally coupling the foot contact component adjacent said outer end within the cradle pivot support portion; and
   one or more resilient components located within the receiver cavity and in compressible contact with said biasing surface of the foot contact component, wherein said frame engagement component further includes a pre-load adjustment member for said one or more resilient components.

2. The foot support apparatus of claim 1 in which:
   said pivot shaft assembly is configured to absorb vibration and generally isolate the foot contact component from such vibration.

3. The foot support apparatus of claim 2 in which:
   said pivot shaft assembly is configured having an outwardly disposed resilient member engaged with the foot contact component, a bushing member extending across the resilient member and a shaft coupled with the cradle and extending through the bushing.

4. The foot support apparatus of claim 1 in which:
   said frame engagement component is configured having a travel limiter opening;
   said foot contact component motion limiter is configured as a contact surface movable within the travel limiter opening; and
   said pre-load adjustment member includes a contact portion adjustably extending within the travel limiter opening.

5. The foot support apparatus of claim 1 in which:
   the one or more resilient components are configured as one or more of an elastomeric open cylinder or an elastomeric sphere.

6. The foot support apparatus of claim 1 in which:
   the cradle extends outwardly and upwardly from the pivot support portion to define a ramp biasing a driver foot toward the foot support region.

7. Foot support apparatus for a wheeled vehicle having a driver supporting frame with a foot support connection position, comprising:
   a cradle having a receiver cavity at a foot support region extending from a frame engagement component to a foot support end portion, said frame engagement component being attachable with said frame at said support position;
   a foot contact component having an upwardly disposed foot engagable surface, an oppositely disposed biasing portion, extending from an outer end adjacent said cradle foot support end portion generally over said receiver cavity to an inward end generally adjacent the frame engagement component, said foot contact component being mounted for pivotal movement with respect to said cradle foot support region;
   one or more resilient components located within the receiver cavity and in compressible contact with said biasing portion of the foot contact component wherein said frame engagement component further includes a pre-load adjustment member for said one or more resilient components; and
   a pivot shaft assembly pivotally coupling one end of the foot contact component with the cradle.

8. The foot support apparatus of claim 7 in which:
   said pivot shaft assembly is configured to absorb vibration and generally isolate the foot contact component from such vibration.

9. The foot support apparatus of claim 8 in which:
   said pivot shaft assembly is located adjacent said cradle foot support end portion.

10. The foot support apparatus of claim 9 in which:
    said pivot shaft assembly is configured having an outwardly disposed resilient member engaged with the foot contact component, a bushing member extending across the resilient member and a shaft coupled with the cradle and extending through the bushing.

11. The foot support apparatus of claim 7 in which:
    said cradle and said foot contact component are configured to provide motion limiter limiting the extent of foot contact component pivotal movement.

12. The foot support apparatus of claim 11 in which:
    said motion limiter is adjustable to effect a pre-loading of said foot contact component against the one or more resilient components.

13. The foot support apparatus of claim 7 in which:
    the one or more resilient components are configured as one or more of an elastomeric open cylinder or an elastomeric sphere.

14. The foot supported apparatus of claim 13 in which:
    said resilient component is generally shaped as a sphere.

15. The foot support apparatus of claim 7 in which:
    the cradle extends outwardly and upwardly from said foot support end portion to define a ramp biasing a driver foot toward the foot support region.

16. Foot support apparatus for a wheeled vehicle having a driver supporting frame with a foot support connection portion, comprising:

a cradle having a receiver cavity at a foot support region extending from a frame engagement component to a foot support end portion, said frame engagement component being attachable with said frame at said foot support connection portion;

one or more elastomeric shock absorber members located at select positions within said receiver cavity; and a foot contact component having an upwardly disposed foot engagable surface, an oppositely disposed biasing portion compressibly contactable with said elastomeric shock absorber members and configured having a sequence of elastomeric shock absorber member position stabilizing indentation segments, said foot contact component extending from an outer end adjacent said cradle foot support end portion to an inward end generally adjacent the frame engagement component, said foot contact component being mounted for pivotal movement against the elastomeric shock absorber members.

17. The foot support apparatus of claim 16 in which:

said cradle and foot contact component are mutually configured to define a travel limiter limiting the extent of said foot contact component pivotal movement and adjustable to effect a select preloading of said foot contact component against the elastomeric shock absorber members.

18. The foot support apparatus of claim 17 in which:

two or more elastomeric shock absorber members are located within the receiver cavity, at least one thereof exhibiting a diametric extent greater than the other.

\* \* \* \* \*